Figure 1:
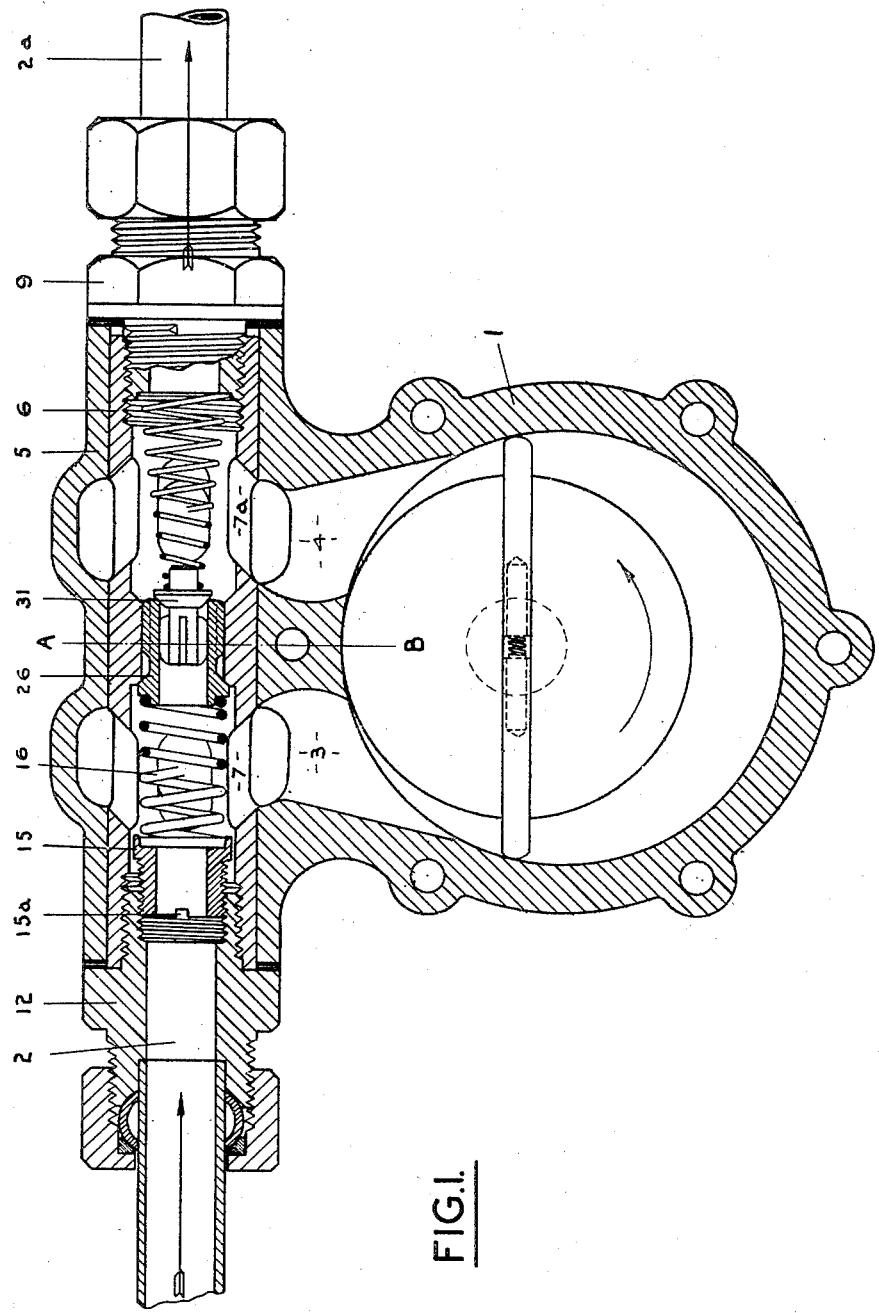

May 30, 1950

L. BURN 2,509,958

VALVE

Filed June 20, 1944

2 Sheets-Sheet 1

Inventor
Lewis Burn
By
Attorneys

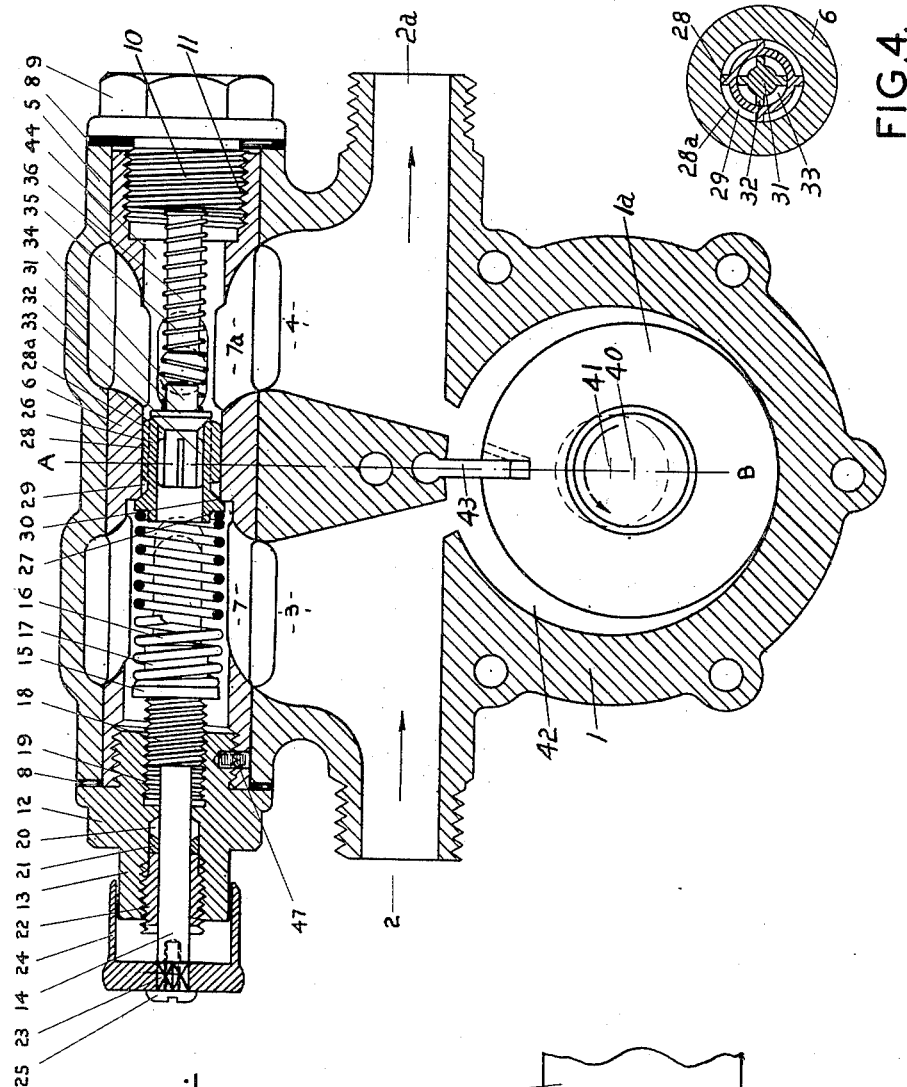

Patented May 30, 1950

2,509,958

UNITED STATES PATENT OFFICE 2,509,958

VALVE

Lewis Burn, London, England

Application June 20, 1944, Serial No. 541,225
In Great Britain November 6, 1942

4 Claims. (Cl. 277—45)

This invention relates to improvements in valves for rotary impulse pumps and has more particular reference to intermittent pressure pumps. Such types of pumps embrace the known oscillating or rotary type wherein delivery fluctuates between zero and maximum at each revolution.

The invention is especially applicable to pumping systems wherein there is a foot valve at the inlet or suction pipe terminal and either a considerable length of suction or delivery piping or both and wherein a pulsating movement of the water column or columns is produced, the momentum of the water in the said columns increasing the volume of the foot valve intake over and above the swept volume of the rotor, and thus increasing the volumetric efficiency of the pump. In some systems the arrangements and conditions of operation are frequently such that the suction side of the pump is required to be satisfied not from the delivery column but through a relief valve, this condition being necessary in pumping systems wherein the pump is kept running but the delivery is checked or closed.

According to the invention there is provided in a rotary impulse pump of the intermittent pressure type both a relief valve i. e. delivery to inlet, and a by-pass valve admitting inlet to delivery. The by-pass valve admits the increased volume of water at the intake foot valves over and above the pump piston swept volume to pass to delivery with the least possible resistance. The two valves therefore are opposed in their operation the one to the other, and it is convenient for the purposes of manufacture to provide the valves contiguous the one to the other as a combined unit as means that will allow the above combined valve gear as an entity when placed across the pump ports to be reversed, such arrangement enabling either direction of drive of the pump to take place or the valve gear to be reversed in cases where in coupling the pump to existing pipes the normal delivery side of the pump has to be the suction side.

The sleeve carrying said valves is disposed in a suitable cavity within the said pump casing and is capable of having a reversible position therein and secured in either position in a fluid tight condition. The relief valve is held closed to suction by resilient means, the degree of pressure thereon being adjustable by an external device. Further in some types of pumps the fluid inlet delivery pipes and valve gear are aligned so that the by-pass valve operates to admit fluid to the delivery system without passing through the pump.

Further there is provided a pocket or reservoir for fluid adjacent the inlet and outlet ports said pocket providing a suction reserve that has proved beneficial when pumping volatile fluids, since it tends to create no vapourising point in the column of liquids when the latter is subjected to intermittent impulses. The same applies to the delivery side of the pump and equally on reversal of the valve gear or direction of drive of the pump the inlet and outlet are identical.

The invention consists in the manufacture of rotary intermittent pressure pumps for fluids having in combination with a pumping member a combined relief and by-pass valve device wherein said valves are resiliently mounted and axially aligned in a dismountable cylindrical sleeve, said sleeve having inlet and delivery ports coincident with like ports in said pump and wherein said valves are mounted within said sleeve intermediate of said ports.

The invention further consists in providing adjacent the pump intake and delivery ports, pockets or small reservoirs for the purpose set out above. The type of rotary pump to which the invention relates may be of the eccentric oscillating piston disc type or the rotary eccentric disc type with vanes mobile within said disc.

In order that the invention may be more fully described and ascertained reference is made to the accompanying drawings in which—

Fig. 1 shews in part sectional elevation the valve gear constituting this invention as applied to a rotary pulsating pump of the vane type and wherein the suction and delivery pipes are aligned, the relief and by-pass valves intervening.

Fig. 2 shews the invention as applied to an oscillating disc type pump wherein the suction and delivery are not aligned.

Fig. 3 shews a fragmentary external view of an adjustment device for relief valve spring.

Fig. 4 is a section through the relief and by-pass valves on line A—B, Fig. 2.

According to the illustration and referring to Fig. 2 a form of the invention is shown and as applied to an oscillating disc type of pump 1 which is provided with a suction inlet 2 and a delivery outlet 2a. Ports 3 and 4 respectively communicate with a tubular housing 5 preferably formed within the substance of the casing of the pump 1. The tubular housing 5 is machined internally and within same is fitted a ported sleeve 6. The said sleeve in the form shown is arranged so that the ports 3 and 4 communicate with ports 7 and 7a in the ported sleeve 6. Said ports 7 and 7a are equally spaced about the centre A—B, it being arranged that the valve gear hereinafter described is mounted within the sleeve 6 between the ports 7 and 7a. A fluid-tight connection is made at each end of the tubular housing by means of packing washers 8 which at the by-pass valve end is locked into position by a flange and hexagon-headed plug 9 having a screwed extremity 10 engaging the threaded interior of the ported sleeve 6 at 11. At the relief valve side of the said ported sleeve 6 a flange and hexagon-headed plug 12 is adapted to press upon the washer 8 and seal the housing 5 against egress of fluid. The plug 12 is threaded as at 11 to the interior of the sleeve 6 and is fashioned with a cylindrical extension 13. Mounted within the extension 13 of plug 12 is a spring adjustment stud bar 14 having an enlarged and headed abutment 15 adapted to receive the coils of the spring 16, a cylindrical extension 17 of the said abutment acting as a guide and retaining device for the spring 16. At the rear of the abutment 15 there is provided a threaded screwed stud 18 formed on the rod 14 engaging a threaded socket 19 provided in the plug 12. The rod 14 is made fluid-tight by means of a packing 20, a packing ring 21 and a threaded gland plug 22. The end of the rod 14 is provided with a square extremity 23 over which is placed a micrometer cap 24, the latter being secured in place by means of a locking screw 25. The spring 16 engages the hollow relief valve 26, the annular seating 27 being formed on said valve to accommodate the terminal coil of the spring 16. The hollow relief valve 26 is formed with external projecting ribs 28, see Fig. 4, engaging the walls of the fluid passage 28a in sleeve 6, leaving passages 29 surrounding the greater part of its periphery for fluid flow when the said relief valve by fluid pressure is removed from its seating 30 formed as shown in a thickened portion of the sleeve 6. Within the cylindrical interior of the relief valve 26 is mounted the by-pass valve 31 which is also formed with projections 32 providing ports 33 for admission of fluid through the centre of the relief valve when the by-pass valve 31 lifts from its seating. The said by-pass valve 31 is formed with a shank 34 for aligning the spring 35, said spring being mounted about a rod 36 formed with or secured to the plug extremity 10, said spring abutting at its end remote from the valve upon the base of the plug 9.

The operation of this form of the invention is as follows: The circular pumping disc 1A of the pump 1 in moving in the direction shown by the arrow and by reason of its being mounted on an axis 40 which is eccentric to the axis of the cavity 41, is about to deliver a charge of liquid through the port 2a, and in such movement is inducing a flow of fluid to the space 42 on the reverse side to that of delivery of the abutment plate 43. If, for any reason, delivery is not required and the pump is running, egress of fluid from the port 2a is stopped and the pressure builds until the fluid passes through the ports 4 and 7a, enters the valve chamber 44 and the relief valve 26 is lifted from its seating, allowing the fluid under pressure to pass through the ports 7 and 3 to the suction or intake side of the pump. During such movement of the relief valve, the by-pass valve 31 remains upon its seat, the direction of fluid flow assisting. The resilient load upon the relief valve 26 is adjusted by means of the cap 24 which is graduated circumferentially as at 45, the load being adjusted upon the said spring 16 by turning the cap 24 either right or left handed, the amount of compression being measured in relation to the axial markings 46 upon the cylindrical extension 13 of the screwed plug 12. If the pump 1 is operating with a long column of suction and delivery, there will be intermittent pressure exerted in the column and the resulting surge causes fluid from the intake to pass through the relief valve and lift the by-pass valve 31, allowing an excess of liquid over and above that pertinent to the swept volume of the pump to pass to the delivery side without its passage through the pump as such at all.

It will be observed from the drawing that the ported sleeve 6 constituting the valve housing is capable of being reversed, so that the delivery side as shown in the illustration can be reversed, and since in this form of pump installation the suction and delivery piping is of the same diameter and the borings also of equal dimensions, it is a convenience to be able to change the direction of pumping. In manufacture it will be observed that the tooling is reduced to a minimum, the housing 5 to the ported sleeve being a straight boring operation and the whole of the valve arrangements can be assembled in the sleeve 6 and adjusted prior to placing the valve gear and sleeve 6 within the body of the pump.

It will be noted that a security device in the form of grub or lock screws 47 secures the plug 12 into place, and in its shop-adjusted position within the valve chamber 6. The by-pass valve spring can equally be adjusted externally by the same means as those shown in regard to the relief valve 26, but as the adjustment of this valve is not critical, the strength of the spring having first been determined according to the size of the pump and the surge produced, there is no need to alter it after the first setting.

About the inlet and outlet ports 3 and 4 are arranged enlargements or pockets 48 capable of holding fluid in readiness for pumping.

In the form of the invention shewn in Fig. 1 the inlet pipe 2 is aligned with the valve gear and sleeve 6 and outlet 2a. This embodiment of the invention enables the excess fluid over swept volume of the pump under pulsation to pass direct from the inlet 2, through the by-pass valve 31 to the delivery pipe 2a without passing through the pump 1. The construction of this modification is substantially similar to that shown in Fig. 2 but to provide adjustment of the spring 16 of the relief valve 26 the hollow abutment stud 15 threaded within the plug 12 is provided with a driving notch 15a rendering the said hollow stud 15 adjustable by means of a screw driver inserted through the plug 12 upon assembly. Coupling in a known manner is made between the inlet and outlet pipes and the sealing plugs 9 and 12 as shewn.

I claim:

1. A valve structure comprising a casing having a bore therein and passages communicating therewith, a sleeve mounted in the bore in the casing and having axially spaced ports therein communicating respectively with the passages in the casing, the sleeve having an interior bore which is of reduced diameter between said ports and provided with a valve seat at one end, a tubular relief valve mounted slidably in said reduced portion of the bore of the sleeve and engageable exteriorly at one end with said valve seat and having a valve seat at its opposite end, a by-pass valve slidably mounted within the tubular relief valve and engageable with the valve seat thereon, plugs threaded into the respective ends of the sleeve and abutting against adjacent portions of the casing for securing the sleeve in the casing, and springs interposed between the relief valve and the by-pass valve and the respective plugs and acting to yieldingly hold said valves on their respective seats.

2. A valve structure as defined in claim 1, wherein said spring acting on said by-pass valve is yieldable to permit direct flow of fluid axially through said tubular relief valve while seated.

3. A valve structure as defined in claim 1, wherein the ends of said sleeve are open, and said plugs are hollow and communicate therewith and provide intake and delivery connections.

4. A valve structure as defined in claim 1, including an adjustable abutment engaging said spring for said relief valve and threaded in the respective plug, an axially movable and rotatable shaft extending through said last mentioned plug and connected to said abutment, axially graduated markings on said last mentioned plug, and a manually operable cap fixed to said shaft and having circumferential graduations thereon to cooperate with said markings and thereby indicate the adjustment of the spring for said relief valve.

LEWIS BURN.

REFERENCES CITED

The following references are of record in the file of this patent:

UNITED STATES PATENTS

| Number | Name | Date |
|---|---|---|
| 549,413 | White | Nov. 5, 1895 |
| 1,213,710 | Timpson et al. | Jan. 23, 1917 |
| 1,229,885 | Chadwick | June 12, 1917 |
| 1,675,079 | Zisch | June 26, 1928 |
| 1,868,444 | Berhtold | July 19, 1932 |
| 1,913,128 | Peter | June 6, 1933 |
| 1,980,404 | Harman et al. | Nov. 13, 1934 |
| 2,000,431 | Aumack | May 7, 1935 |
| 2,122,045 | Rose et al. | June 28, 1938 |
| 2,126,874 | DesChamps | Aug. 16, 1938 |
| 2,157,089 | Storeh et al. | May 2, 1939 |
| 2,162,743 | Norborn | June 20, 1939 |
| 2,187,371 | Cannon | Jan. 16, 1940 |
| 2,189,210 | Johnson | Feb. 6, 1940 |
| 2,280,392 | Herman et al. | Apr. 21, 1942 |
| 2,393,589 | Compton et al. | Jan. 29, 1946 |